(12) United States Patent
He

(10) Patent No.: US 12,423,541 B2
(45) Date of Patent: Sep. 23, 2025

(54) INDICIA LOCATION COPROCESSOR

(71) Applicant: ZEBRA TECHNOLOGIES CORPORATION, Lincolnshire, IL (US)

(72) Inventor: Duanfeng He, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/113,855

(22) Filed: Feb. 24, 2023

(65) Prior Publication Data

US 2024/0289578 A1    Aug. 29, 2024

(51) Int. Cl.
*G06K 7/14* (2006.01)
*G06T 7/11* (2017.01)
*G06T 9/00* (2006.01)
*G06V 10/25* (2022.01)
*G06V 10/60* (2022.01)

(52) U.S. Cl.
CPC .............. *G06K 7/1443* (2013.01); *G06T 7/11* (2017.01); *G06T 9/00* (2013.01); *G06V 10/25* (2022.01); *G06V 10/60* (2022.01); *G06V 2201/07* (2022.01)

(58) Field of Classification Search
CPC ........... G06K 7/1443; G06T 7/11; G06T 9/00; G06V 10/25; G06V 10/60; G06V 2201/07
USPC ..................................................... 235/462.08
See application file for complete search history.

(56) References Cited

U.S. PATENT DOCUMENTS

2011/0085732 A1*  4/2011  Cheng ...................... G06K 7/14
                                                       235/462.11
2023/0034323 A1*  2/2023  Laffargue ........... G06K 7/10722

* cited by examiner

*Primary Examiner* — Daniel A Hess

(57) ABSTRACT

An indicia location coprocessor is disclosed herein. An example indicia location coprocessor includes imaging device comprising: (1) an image sensor to capture image data; (2) a front-end processing assembly configured to: (i) receive the image data and determine image statistics for the image data, (ii) determine, from the image statistics, an indicia location corresponding to a set of point coordinates in the image data, and, (iii) communicate the image data and the determined indicia location to a host processor communicatively coupled to the front-end processing assembly; and (3) wherein the host processor is configured to receive the image data and the indicia location and is configured to decode an indicia in the image data based upon determining a position in the image data corresponding to the indicia location.

20 Claims, 6 Drawing Sheets

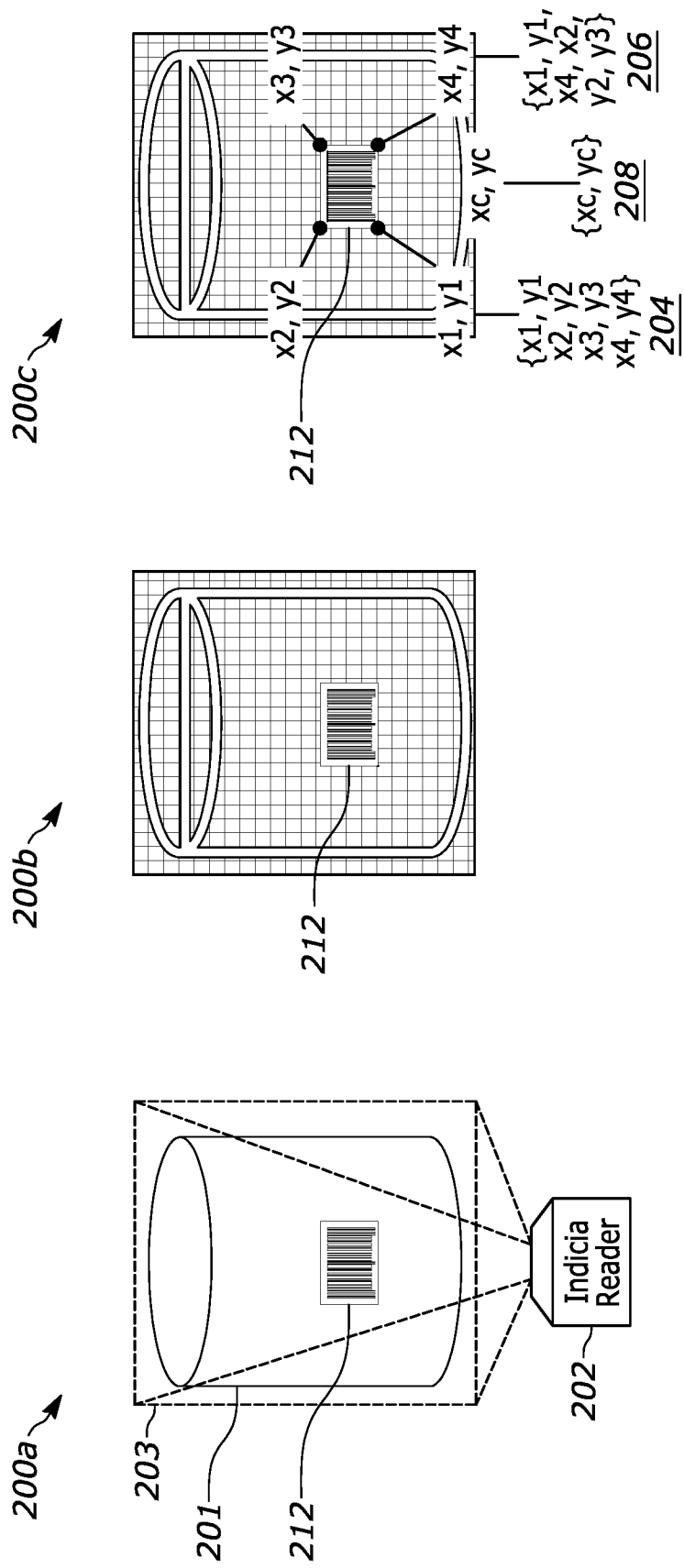

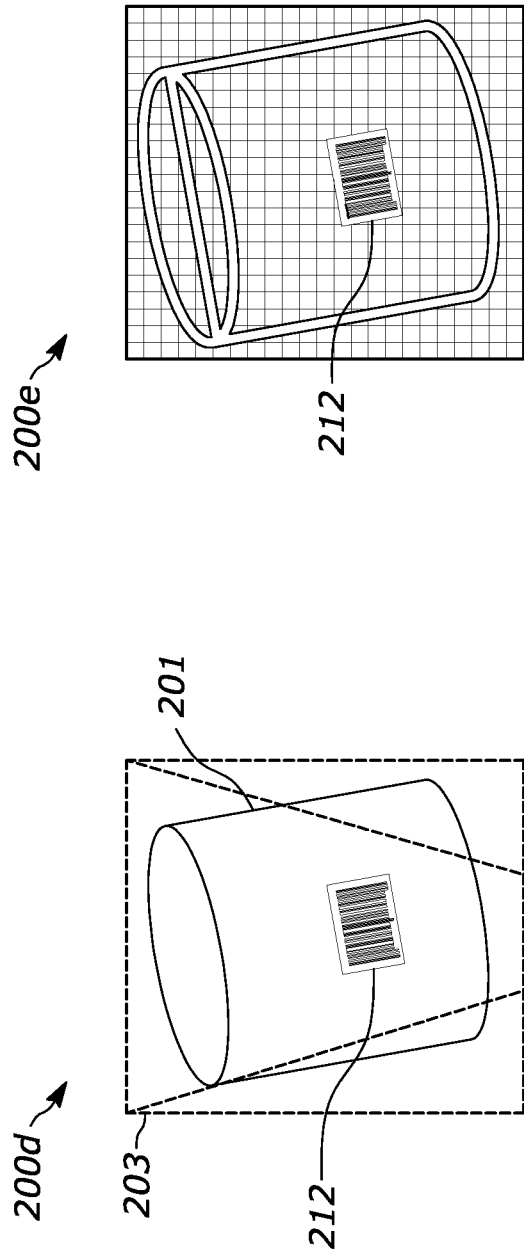

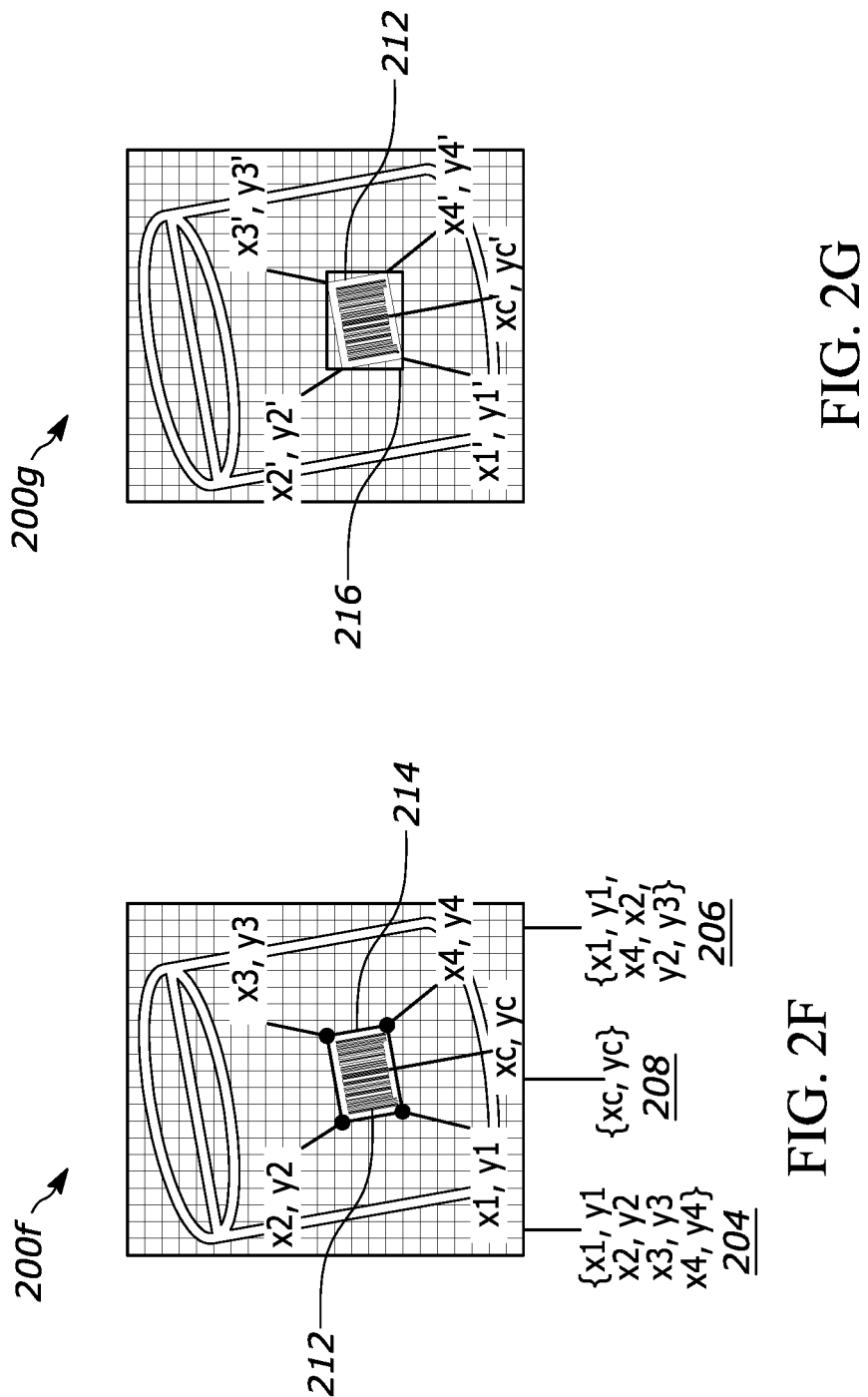

INDICIA LOCATION COPROCESSOR

BACKGROUND

Traditional indicia readers may have three primary components: an image sensor, an initial image processor, and a host processor. Typically, the image sensor captures image data of an object containing the indicia, the initial image processor determines image statistics from the image data, and the host processor processes the image data using the image statistics to: (i) locate the indicia in the image data, (ii) decode the indicia to collect data stored in the indicia, and (iii) process the data from the indicia.

This arrangement puts strain on the digital interconnection between the initial image processor and the host processor, causing a bottleneck in host processor capacity and slowing down processing frame rate. The strain can be especially acute for host processors that receive large sized image data, which generally corresponds to large sized image statistics, or that receive image data captured high frame rates.

SUMMARY

In an embodiment, the present invention may be an imaging device comprising: (1) an image sensor; (2) a front-end processing assembly; and/or (3) a host processor. The image sensor may capture image data; the front-end processing assembly may be configured to: (i) receive the image data and determine image statistics for the image data, (ii) determine, from the image statistics, an indicia location corresponding to a set of point coordinates in the image data, and/or (iii) communicate the image data and the determined indicia location to the host processor which may be communicatively coupled to the front-end processing assembly; and/or the host processor may be configured to: (i) receive the image data and the indicia location and/or (ii) decode an indicia in the image data based upon determining a position in the image data corresponding to the indicia location.

The image statistics may be determined by segmenting the image data into a plurality of image blocks of a predetermined size (e.g., 8×8 pixels) and analyzing the image data at each of the segmented blocks. The image statistics may be image contrast, maximum intensity, minimum intensity, average image intensity; direction of edges; and/or diversity of direction edges. For example, the front-end processing assembly may be configured to determine the image statistics by constructing a version of the image data (e.g., a contrast version of the image data, a maximum intensity version of the image data, a minimum intensity version of the image data, etc.). The front-end processing assembly may then determine the indicia location based upon the constructed version of the image data.

The indicia location may be (i) a set of one or more point coordinates related to the outline of an object of interest in the image data, (ii) a rectified bounding box enclosing an object of interest in the image data, (iii) a single point coordinate in the image data (e.g., a centroid of the image data) according to predetermined criteria, and/or (iv) any other image location indication and/or data derived from a portion of the image data.

In a variation of this embodiment, the front-end processing assembly may comprise (i) a first processor configured to receive the image data and determine the image statistics and (ii) a second processor configured to determine the indicia location. In this variation, the first processor and the second processor may be co-processors of an integrated circuit. Alternatively, the first processor and the second processor may be dedicated processors coupled together via a dedicated communication bus. In another variation of this embodiment, the front-end processing assembly may comprise a single processor configured to receive the image data, determine the image statistics, and determine the indicia location.

In another embodiment, the present invention may be a computer-implemented method comprising: (1) capturing, by an image sensor, image data; (2) passing, by the image sensor to a front-end processing assembly, the image data; (3) determining, by the front-end processing assembly, image statistics for the image data; (4) determining, by the front-end processing assembly from the image statistics, an indicia location corresponding to a set of point coordinates in the image data; (5) passing, by the front-end processing assembly to a host processor, the image data and the indicia location; (6) determining, by the host processor a position in the image data corresponding to the indicia location; and/or (7) decoding, by the host processor, an indicia in the image data based upon the determined position in the image data corresponding to the indicia location.

In a variation of this embodiment, determining the image statistics may also include: segmenting, by the front-end processing assembly, the image data into a plurality of image blocks of a predetermined size; determining, by the front-end processing assembly for each image block, one or more of: (i) image contrast, (ii) maximum intensity, (iii) minimum intensity, (iv) average intensity, (v) direction of an edge, or (vi) diversity of directions of edges; constructing, by the front-end processing assembly, a constructed version of the image data (e.g., a contrast version of the image etc., a maximum intensity version of the image etc., a minimum intensity version of the image data, etc.); and/or determining, by the front-end processing assembly, the indicia location from the constructed version of the image data.

In another variation of this embodiment, determining an indicia location corresponding to a set of point coordinates in the image data may also include: determining, by the front-end processing assembly, a set of one or more point coordinates related to an object of interest in the image data; determining, by the front-end processing assembly, a rectified bounding box enclosing an object of interest in the image data, wherein the rectified bounding box has horizontal sides parallel to a horizontal axis of a coordinate plane and vertical sides parallel to a vertical axis of the coordinate plane; and/or determining, by the front-end processing assembly, a centroid of a portion of the image data based upon a predetermined criteria.

In yet another variation of this embodiment, capturing the image data may also include: capturing, by the image sensor, a series of images at a first predetermined time interval; passing, by the image sensor to the front-end processing assembly, each image in the series of images at the first predetermined time interval; and/or passing, by the front-end processing assembly to the host processor, the indicia location at a second predetermined time interval, wherein the first predetermined time interval is shorter in time than the second predetermined time interval.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2A illustrates an example environment for devices and systems implementing the indicia location coprocessor;

FIG. 2B illustrates an example image statistic generated by the front-end processing assembly;

FIG. 2C illustrates an example indicia location generated by the front-end processing assembly;

FIG. 2D illustrates an example environment for devices and systems implementing the indicia location coprocessor;

FIG. 2E illustrates an example image statistic generated by the front-end processing assembly;

FIG. 2F illustrates an example indicia location generated by the front-end processing assembly;

FIG. 2G illustrates an example indicia location determined by the front-end processing assembly;

Figure 1:
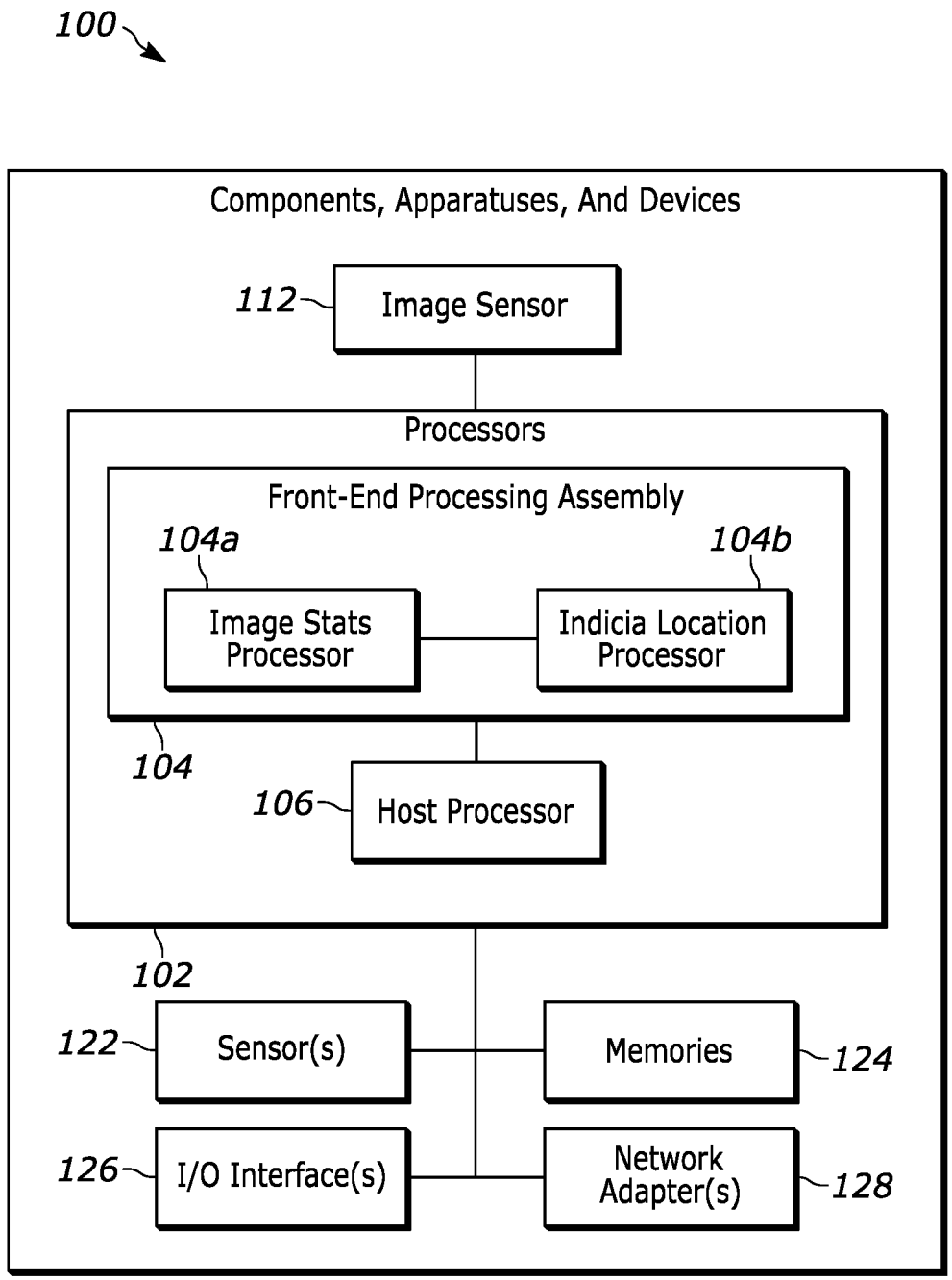
FIG. 1 illustrates exemplary components, apparatuses, and devices for implementing the indicia location coprocessor.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure relates generally to an imaging device that may include one or more image sensors, a front-end processing assembly; and/or a host processor. The image sensors capture images of objects in a field of view, such as objects displaying indicia, and that captured image data is sent to the host processor indicia decoding. With the present techniques, however, the front-end processing assembly may process those captured images and develop image statistics (e.g., reduced memory sized representations of the captured image, such as a downsampled image) that retain at least some image data corresponding to a location of the indica. The front-end processing assembly may process the image statistics and determine the indicia's location on the object in the images, which may be passed to the host processor and used to further expedite indicia decoding and processing.

In these and other ways described herein, the present techniques can greatly reduce processing strain on the host processor, allowing for far more efficient processing of the images and faster locationing and decoding of indicia. Additionally, with the present techniques, imaging devices can be deployed with high resolution image sensors, producing large image data files, without concern for degradation of performance. Further, image devices can capture image data at higher resolutions and/or at a higher frame rates without degrading the host processor performance and decode times. Yet further still, the present techniques allow for imaging devices capable of capturing images over larger fields of view (FOV) than conventional imagers, irrespective of whether the object is in the near field or far field.

The methods, systems, and techniques described herein may implemented by various types of imaging devices, including, but not limited to, handheld barcode scanners, hands-free barcode scanners, bioptic scanners, and/or machine vision systems that may perform indicia scanning and decoding.

FIG. 1 illustrates example components, apparatuses, and devices 100 that may be used for implementing the indicia location coprocessor. The example components, apparatuses, and devices 100 may include a plurality of processors 102, an image sensor 112, one or more sensors 122, one or more memories 124, one or more I/O interfaces 126, and/or one or more network adapters 128.

The plurality of processors 102 may include, at least, a front-end processing assembly 104 and a host processor 106. In some embodiments, the front-end processing assembly 104 may be a single processor. In some alternative embodiments, the front-end processing assembly 104 may be and/or include, at least, an image stats processor 104a and an indicia location processor 104b. In these embodiments, the image stats processor 104a and the indicia location processor 104b may be co-processors of an integrated circuit. Alternatively, the image stats processor 104a and the indicia location processor 104b may be dedicated processors coupled together via a dedicated communication bus. The plurality of processors 102 may be, or may include, one or more central processing units (CPU), one or more coprocessors, one or more microprocessors, one or more graphical processing units (GPU), one or more digital signal processors (DSP), one or more application specific integrated circuits (ASIC), one or more programmable logic devices (PLD), one or more field-programmable gate arrays (FPGA), one or more field-programmable logic devices (FPLD), one or more microcontroller units (MCUs), one or more hardware accelerators, one or more special-purpose computer chips, and one or more system-on-a-chip (SoC) devices, etc. In some embodiments, the image stats processor 104a and/or the indicia location processor 104b may be at least one or two application specific integrated circuit(s) (ASIC), at least one or two field-programmable gate array(s) (FPGA), at least one or two field-programmable logic device (s) (FPLD), and/or any other similar dedicated, application-specific processors. Similarly, in some embodiments, the host processor 106 may be a central processing unit (CPU), a graphical processing unit (GPU), or any other similar general purpose processor. In some embodiments, the host processor 106 may be coupled to the front-end processing assembly 104 via a dedicated communication bus. The image sensor 112 may be, or may include, any image capturing device, unit, and/or component capable of capturing image data of a particular field of view (FOV) of the image sensor 112. The image data may be, or may include, any electromagnetic data relating to the FOV (e.g., reflected light beams in a scanner, a digital image in the visible spectrum, a digital image in the infrared spectrum, etc.) that can be digitally stored or converted into data capable of digital storage. The term "image data" may refer to raw image data and/or lightly processed image data (e.g., compressed raw image data, scaled raw image data, time stamped raw image data, etc.). In some embodiments, the image sensor 112 may have a plurality of photosensitive elements that define a substantially flat surface that may also feature other components (e.g., a housing, lens(es), etc.) for capturing image data over the FOV. The arrangement and configuration of these components may define the FOV. It should be noted, that while the image sensor 112 is described as capturing the image data over a particular FOV, the FOV can be split into multiple sub-fields of view (sub-FOV). Data captured through the sub-FOV of an image sensor 112 would still be considered image data that is captured over the FOV of the image sensor 112. In some embodiments, the image sensor 112 may be communicatively coupled to one or more of the plurality of processors 106 (e.g., the front-end processing assembly 104). In some embodiments, the image sensor 112 may be coupled to one or more of the plurality of processors 106 (e.g., the front-end processing assembly 104) via a dedicated communication bus.

The one or more sensors 122 may be, or may include, one or more light sensors, one or more proximity sensors, one or more motion sensors, and/or one or more weight scales. The one or more sensors 122 may be communicatively coupled to one or more of the plurality of processors 106 and/or the image sensor 112. In some embodiments, the one or more sensors 122 may engage the image sensor 112 upon triggering via an external input. For example, an object may be placed on the one or more weight scales which are also in the FOV of the image sensors 112. The weight scales may then determine a change in weight and transmit a signal to the image sensor 112 to capture an image of the object. It should be noted that other techniques, systems, and methods may be employed to engage the image sensor 112, such as mechanical activation (e.g., the trigger of a hand-held barcode scanner), a timing mechanism, and/or the like.

The one or more memories 124 may be, or may include, any local short term memory (e.g., random access memory (RAM), read only memory (ROM), cache, etc.) and/or any sort of long term memory (e.g., hard disk drives (HDD), solid state drives (SSD), etc.). The one or more memories 124 may be communicatively coupled to one or more of the plurality of processors (e.g., the host processor 106).

The one or more I/O interfaces 126 may be, or may include, any number of different types of I/O units and/or combined I/O circuits and/or I/O components that enable the plurality of processors 102 to communicate with peripheral devices. The peripheral devices may be, or may include output devices such as display units (e.g., display screens, receipt printers, etc.) and/or input devices such as keyboards and/or keypads, interactive screens (e.g., touch screens), navigation devices (e.g., a mouse, a trackball, a capacitive touch pad, a joystick, etc.), speakers and/or microphones, buttons, communication interfaces, etc. The I/O interfaces 126 may also be, or may include digital applications (e.g., local graphical user interfaces (GUIs)).

The one or more network adapters 128 may be, or may include, any wired network adapter, connector, interface, etc. (e.g., an Ethernet network connector, an asynchronous transfer mode (ATM) network connector, a digital subscriber line (DSL) modem, a cable modem) and/or any wireless network adapter, connector, interface, etc. (e.g., a Wi-Fi connector, a Bluetooth® connector, an infrared connector, a cellular connector, etc.) capable of connecting the exemplary components, apparatuses, and devices 100 to other components, apparatuses, and/or devices over one or more networks.

FIGS. 2A and 2D illustrate example environments 200a and 200d, respectfully, for devices and systems implementing the indicia location coprocessor. The example environments 200a and 200d may include an indicia reader 202 to capture image data of one or more objects 201 featuring one or more indicia 212. The indicia may be, or may include, any encrypted and decodable image capable of storing information (e.g., a 1-dimensional (1D) or 2-dimensional (2D) barcode (e.g., a quick response (QR) code or a direct part making (DPM) code)), or any other indicia encoding a payload that may be decoded.

The indicia reader 202 may include any of the example components, apparatuses, and devices 100 illustrated in FIG. 1. In some embodiments, an object 201 featuring an indicia 212 may enter the FOV 203 of the image sensor 112 of the indicia reader 202. While the object 201 is shown has having a single indicia 212, in some examples, an object may have multiple indicia. Such multiple indicia, as is the case with the indicia 212, may be of different types. For example, an object may include a QR code and a barcode, or a barcode and a DPM code. In some embodiments, multiple objects each featuring an indicia may enter the FOV 203 of the image sensor 112 of the indicia reader. Depending on position and orientation of the object 201, the edges of the indicia 212 may be aligned (see, e.g., FIG. 2B) or may not be aligned (see, e.g., FIG. 2D) with the edges of the FOV 203 of the image sensor 112. Once within the FOV 203, the image sensor 112 may capture image data of the object 201 featuring the indicia 212. If the multiple objects are in the FOV 203, the image data will include the multiple objects. Similarly, if multiple indicia are in the FOV 203, the image data will include the multiple indicia. In this way, the image data corresponds to a 2D image of the FOV 203 of the image sensor 112. In some embodiments, the image sensor 112 is engaged in response to a triggering event (e.g., a proximity sensor adjacent to the image sensor 112 triggers once the object 201 featuring an indicia 212 crosses a threshold distance to the proximity sensor which is also within the FOV 203 of the image sensor). The image sensor 112 may pass the image data to the front-end processing assembly 104. As an example, the image sensor 112 may have a 1920×1200 pixel resolution and the image data 103 may have a 2.3 million pixel count with a storage space of 2.3 MB.

In some embodiments, the front-end processing assembly 104 may perform light processing on the image data (e.g., compressing the image data, scaling the image data, attaching a time stamp to the image data, etc.). The front-end processing assembly 104 may pass the image data to the host processor 106 such that the front-end processing assembly 104 and the host processor 106 may process the image data in parallel. Once it has passed the image data, the front-end processing assembly 104 may then process the image data to generate image statistics of the image data and based upon those image statistics determine an indicial location that may be sent to the host processor 106.

FIGS. 2B and 2E illustrate example image statistics 200b and 200c, respectfully, generated by the front-end processing assembly 104 analyzing the image data captured of the object 201. An image statistic may be a constructed version of the image data that has been generated based upon one or more properties of the image data and/or one or more properties of the image sensor 112. The one or more properties may include image contrast, maximum intensity, minimum intensity, average image brightness, etc. For example, the front-end processing assembly 104 may generate a constructed version of the image data based upon a contrasted version of the image data.

In some embodiments, the image data may include image feature data related to the one or more properties. In these embodiments, the front-end processing assembly 104 may read the image feature data and analyze the different numerical values assigned to each of the one or more properties and alter them to a target value. For example, the front-end processing assembly 104 may read that the contrast value of an 8-bit raw image is 185 (on a scale where 0 is the maximum contrast value and 255 is the minimum contrast value). The front-end processing assembly 104 may overwrite the contrast value of the image to 20 and then process the image pixel-by-pixel according to this newly overwritten contrast value.

In some alternative embodiments, the image data may not include image feature data. In these embodiments, the front-end processing assembly 104 may segment the raw image data into image blocks of a predetermined pixel size (e.g., 8×8 pixels). The front-end processing assembly 104 may analyze each of the blocks to determine a property value to each of the blocks (e.g., an intensity value of 80, 103, 54, etc. on a scale where 0 is minimum intensity and 255 is maximum intensity). The front-end processing assembly 104 may then change each of the individual property values to a designated value based upon a predetermined heuristic (e.g., change the block to 255 if the intensity value was 128 or greater and to 0 if the intensity value was less than 128 to generate a maximum intensity version of the image).

Once the image statistic has been generated, the front-end processing assembly 104 may then generate an indicia location corresponding to a set of point coordinates in the image data based upon processing of the image statistic. In some embodiments, the generation of the image statistic is performed by a dedicated image processor of the front-end processing assembly 104 (e.g., the image stats processor 104a). In these embodiments, the image statistic is passed by the dedicated image processor to a coprocessor of the front-end processing assembly 104 (e.g., the indicia location processor 104b) to process the image statistic and generate an indicia location.

FIGS. 2C and 2F illustrate example indicia locations 200c and 200f, respectfully, generated by the front-end processing assembly 104 (e.g., by the indicia location processor 104b). In some embodiments, the front-end processing assembly 104 identifies an indicia in the image statistic or multiple indicia if the image data captured multiple indicia. In some examples, that identification is of a region in the image statistic that has edges, edge orientations, etc. that correspond to known indicia types. In some examples, that identification is of a region in the image statistic that has other features corresponding to an indicia, such as a pattern of light and dark pixels. In any case, for each indicia in the image statistic, an indicia location may be determined by the front-end processing assembly 104 (e.g., the indicia location processor 104b)—as in the illustrated examples of FIGS. 2C and 2D where a single indica is shown. An indicia location may be a set of point coordinates associated with the image statistic that correspond to an indicia located within the image data. The indicia location may be at least four point coordinates of the image statistic (the at least four point coordinates creating analytical edges of a two dimensional segment of the image statistic), a rectified bounding box encasing a portion of the image statistic (the rectified bounding box having horizontal sides parallel to a horizontal axis of a coordinate plane and vertical sides parallel to a vertical axis of the coordinate plane), and/or a singular point coordinate of the image data based upon a predetermined criteria (e.g., the centroid of the image statistic, or the centroid of the portion of the image statistic featuring a certain brightness value, etc.).

A first example of indicia location data is shown as a four X-Y point coordinate pairs forming a vector 204. This indicia location data may also indicate point coordinates of a bounding box around the indicia 212. In examples, where the linear dimension of the sensor is less than 32K in size, each integer of the 8 point coordinates may be expressed as a 2-byte value, thereby allowing for a 16 byte indicia location data. Vector 206 illustrates another way representation that may be used as indicia location data. Another example of indicia location data is shown as a single X-Y point coordinate vector 208 which may represent the centroid of the corresponding indicia. In each of the foregoing examples and/or embodiments, the resulting indicia location data is far smaller in storage space than the image statistic (which may be as large as 1.7 MB). This allows for faster computing time and will allow the host processor 106 to determine the location of the indicia and decode it without having to process the entirety of both the image data and the image statistic.

In some embodiments, the individual pixels of the image data and/or the image statistic may be treated as points on a coordinate plane (e.g., the bottom left corner pixel of the image data and/or the image statistic being designated as the origin with a point coordinate of (0,0), the pixel to the immediate right of the origin having a point coordinate of (1,0), the pixel immediately above the origin having a point coordinate of (0,1), and so on). In these embodiments, the front-end processing assembly 104 (e.g., at the indicia location processor 104b) may read the image feature data of the image statistic pixel-by-pixel until it identifies a different value.

For example, as shown in FIGS. 2C and 2F, the front-end processing assembly 104 may start at the bottom left corner of the image statistic and traverse across it left to right for each row of pixels. In some embodiments, the indicia 212 may have edges aligned with the edges of the image data and/or image statistic, as shown in FIG. 2C, and the front-end processing assembly 104 may detect a pixel with a different property at the bottom left corner of the indicia with a point coordinate of (x1, y1). The front-end processing assembly 104 may store that point coordinate in its register and continue traversing along the image statistic until the front-end processing assembly 104 detects another different property value (e.g., the bottom right corner of the indicia) with a point coordinate of (x2, y2). The front-end processing assembly 104 may also store that point coordinate in its register and repeat this process as it progresses up the image statistic. In this example, the front-end processing assembly 104 would detect a third point coordinate at the pixel above the first point coordinate and a fourth pixel above the second point coordinate. Similarly, the front-end processing assembly 104 would detect a fifth point coordinate at the pixel above the third point coordinate and a sixth pixel above the fourth point coordinate. In each instance, front-end processing assembly 104 would overwrite the value of the third point coordinate and fourth point coordinate until it analyzed a row without detecting a change in property value (ultimately storing point coordinate (x3, y3) as the third point coordinate and (x4, y4) as the fourth point coordinate, respectfully).

In some embodiments, the indicia 212 may not have edges aligned with the edges of the image data and/or image statistic, as shown in FIG. 2F, and the front-end processing assembly 104 may detect a pixel with a different property at the bottom most point of the indicia with a point coordinate of (x1, y1). The front-end processing assembly 104 may store that point coordinate in its register and continue along traversing along the image statistic until the front-end processing assembly 104 detects another different property value (e.g., the first point of the indicia just above the bottom most point) with a point coordinate of (x2, y2). The front-end processing assembly 104 may also store that point coordinate in its register and continue along traversing along the image statistic until the front-end processing assembly 104 detects another different property value (e.g., the last point of the indicia just above the bottom most point coordinate) with a point coordinate of (x3, y3). The front-end processing assembly 104 may also store that point coordinate in its register and repeat this process as it progresses up the image statistic. In this example, the front-end processing assembly 104 would detect a fourth point coordinate at a pixel above the previously saved (x2, y2) with a lesser x-value. In this instance, the front-end processing assembly 104 would overwrite this point coordinate with the newly detected value until it no longer detects a pixel with a lesser x-value. Similarly, the front-end processing assembly 104 would detect a fifth point coordinate at a pixel above the previously saved (x3, y3) with a greater x-value. In this instance, the front-end processing assembly 104 would overwrite this point coordinate with the newly detected value until it no longer detects a pixel with a greater x-value. The front-end processing assembly 104 may also store the most recently detected pixel at point coordinate (x4, y4) until it finds a row where the front-end processing assembly 104 no longer detects a change in pixels (e.g., the highest point coordinate in the indicia 212). This processing is provided by way of example, as any number of image processing methods to determine a location of an indicia may be used, whether from first determining edges of the indicia and/or a bounding box or other techniques. Indeed, in some embodiments, a centroid pixel of a bounding box may be determined.

Thus, in some embodiments, the front-end processor 104 may store as the indicia location the four determined point coordinates {x1, y1, x2, y2, x3, y3, x4, y4}. In some embodiments, the indicia location is the a single point coordinate, for example, of the centroid {xc, yc}. In addition to, or in place of, storing specific point coordinates, in some embodiments, the front end-processing assembly 104 may store point coordinates of a bounding box corresponding to the indicia (or a different bounding box corresponding to each indicia). For example, the front-end processing assembly 104 may store four point coordinates containing the maximum x value, the maximum y value, minimum x value, and minimum y value among the pixels analyzed with a different property value to generate a rectified bounding box 214 of the indicia 212, e.g., using those four point coordinate to generate a tight box around the outline of the indicia as shown in FIG. 2F. The bounding box is rectified in that the it is aligned to the orientation of the indicia. In other examples, the front-end processing assembly 104 may generate and store as an indicia location an aligned bounding box 216 or other point coordinates that are aligned with the orientation of the indicia reader 202 and FOV 203. In FIG. 2G for example, an image statistic 200g is shown having an object 201 with an identified indicia 212 and an aligned bounding box 216 determined by the indicia location processor 104 where the aligned bounding box 216 is aligned with the orientation of image sensor 112, thus resulting in indicia location data containing point coordinates {x1', y1', x2', y2', x3', y3', x4', y4"} that are stored and sent to the host processor 106. Generating an indicia location that contains point coordinates or other location data that is aligned to the image sensor 112 or other reference point may be desired in some instances to increase host processor 106 indicia decoding speeds for example. Such aligned location data, for example, ensures that the host processor 106 receives location data that is independent of (or near independent) the orientation of the indicia 212. In this way, variations in the orientation of the object 201 can be compensated for and the indicia location data normalized across different image scans, different objects, etc.

In some embodiments, the front-end processing assembly 104 may determine and store a single point coordinate (e.g., the centroid of a bounding box and/or the indicia 212) instead. For example, the front-end processing assembly 104 may utilize an aligned bounding box 216 as described above. However, instead of storing four points that make up the aligned bounding box 216, the front-end processing assembly may calculate and the center point coordinate {xc', yc'} of the aligned bounding box, as illustrated in FIG. 2G. Similarly, the front-end processing assembly 104 may determine the center point coordinate {xc, yc} of a rectified bounding box 214, as illustrated in FIGS. 2C and 2F. This may further reduce the amount of data that needs to be stored and/or transferred to the host processor 106.

In some embodiments, the front-end processing assembly 104 may be pre-programed to follow a more optimal traversal algorithm (e.g., the binary search algorithm) to further reduce processing time in determining the image statistic and/or the indicia location.

In the embodiments where multiple indicia are captured in the image data, the front-end processing assembly 104 may determine the indicia locations of each of the indicia using the foregoing methods and systems.

Once the indicia location has been generated, the front-end processing assembly 104 may then pass the indicia location to the host processor 106. The host processor 106 may use the indicia location to locate an indicia within the image data. Once located, the host processor 106 may decode the indicia to obtain indicia data.

It should be noted that in some alternative embodiments, the image statistics and the indicia location can be generated together based upon analyzation techniques of the image data by the front-end processing assembly 104. For example, the front-end processing assembly 104, using the Sobel operator, can algorithmically detect edges within the image data (generating an image statistic). Additionally, based upon the direction of the edges of the indicia (e.g., outer 90 degree angles of the indicia, the straight lines of a 1D barcode, geometric shapes of a 2D barcode, etc.), the front-end processing assembly 104 can determine the location of the indicia as well as the indicia's type (e.g., 1D barcode, 2D barcode, etc.).

Figure 3:
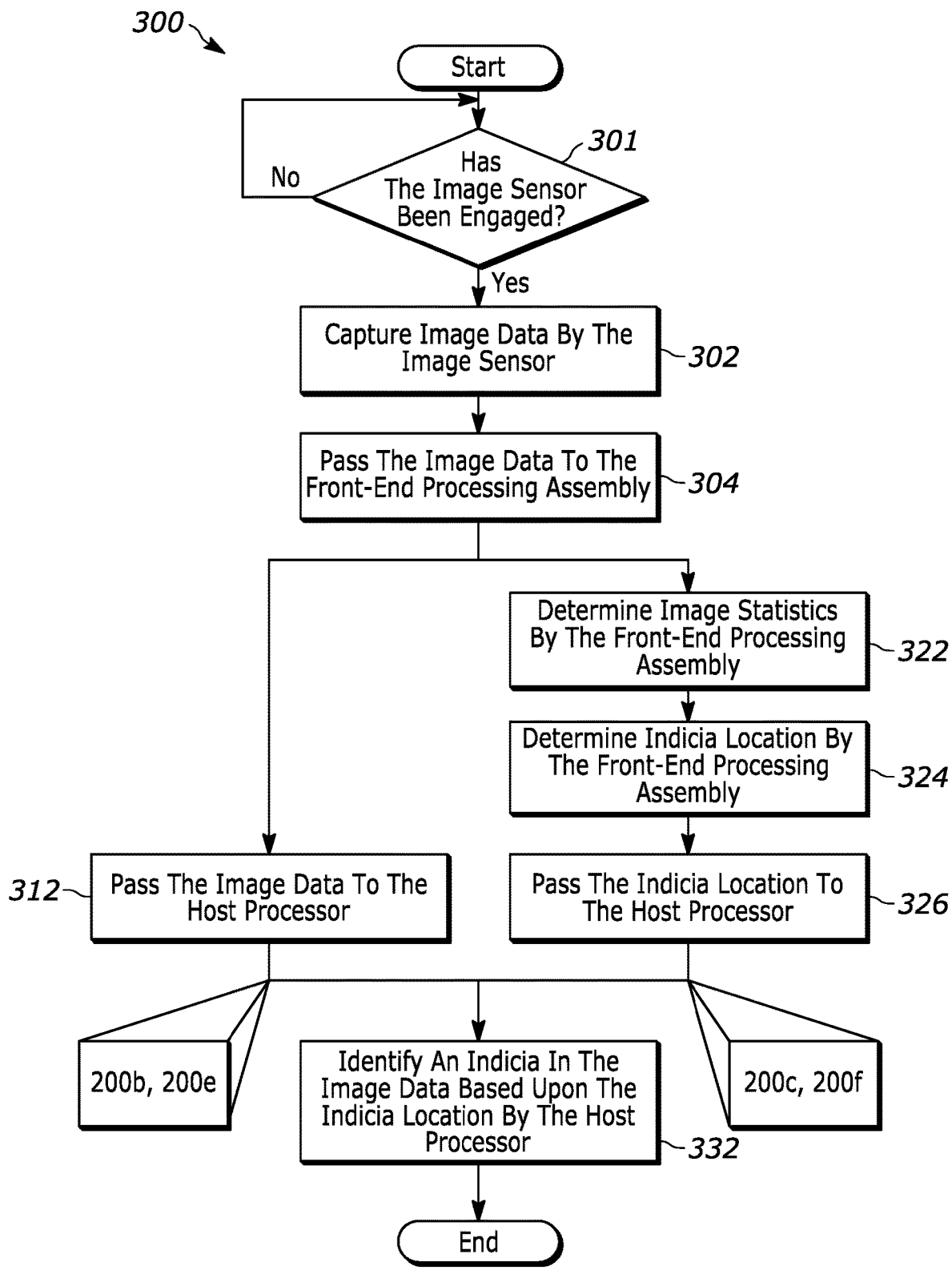
FIG. 3 is a block diagram of an example flowchart for implementing example methods and/or operations described herein.

FIG. 3 is a block diagram representative of an example flowchart capable of implementing, for example, one or more components of the example indicia location coprocessor as implemented in FIGS. 1-3. The example flowchart of FIG. 3 is an example processing platform 300 capable of executing instructions to, for example, implement operations of the example methods described herein, as may be represented by the flowcharts of the drawings that accompany this description. Other example flowcharts capable of, for example, implementing operations of the example methods described herein include field programmable gate arrays (FPGAs) and application specific integrated circuits (ASICs).

The example processing platform 300 of FIG. 3 may be implemented by the plurality of processors 106. The plurality of processors 106 may include one or more registers capable of temporarily storing data, and the plurality of processors 106 may include further storage capacity in the form of integrated memory slots. The plurality of processors 106 may also be communicatively coupled to the one or more memories 104. The plurality of processors 106 may interact with the any of the forgoing (e.g., registers, integrated memory slots, one or more memories 104) to obtain, for example, machine-readable instructions corresponding to, for example, the operations represented by the flowcharts of this disclosure.

The example flowchart of the example processing platform 300 may begin with the image sensor 112 being engaged to capture image data (301). If the image sensor has not been engaged, the example flowchart of the example processing platform 300 may return back to the start of block 301. If the image sensor 112 has been engaged (e.g., upon the one or more sensors 122 triggering and engaging the image sensor 112), the image sensor 112 may capture image data (302).

Once the image data has been captured, the image sensor 112 may pass the image data to the front-end processing assembly 104 (304). The front-end processing assembly 104 may pass the image data to the host processor (312), upon receipt of the image data. In some embodiments, the image sensor 112 may pass the image data as raw (unprocessed) image data. Alternatively or additionally, in some other embodiments, the image sensor 112 may perform initial image processing on the image data before passing it to the host processor 106. Further, in some embodiments, the front-end processing assembly 104 may be configured to buffer the image data before passing it to the host processor 106. For example, the front-end processing assembly 104 may wait a predetermined number of frames of image data before passing the image data to the host processor 106. Alternatively or additionally, in some embodiments, the front-end processing assembly 104 may first pass the image data to the image stats processor 104a before sending the image data to the host processor 106. In some alternative embodiments, the image sensor 112 may pass the image data to both the front-end processing assembly 104 and the host processor 106, for example in configurations where dedicated bus channels extend from the image sensor 112 to each of the assembly 104 and the host processor 106.

Upon receiving the image data, the front-end processing assembly 104 may determine image statistics from the image data (322). Once generated, the front-end processing assembly 104 may determine an indicia location based upon the image statistics (324). The front-end processing assembly may pass the indicia location to the host processor 106 (326).

Once the host processor 106 receives both the image data and the indicia location, the host processor 106 may locate and identify an indicia in the image data based upon the indicia location (332). The example flowchart of the example processing platform 300 may exit.

Alternative implementations of the example represented by the flowchart includes one or more additional or alternative elements, processes and/or devices. Additionally or alternatively, one or more of the example blocks of the flowchart may be combined, divided, re-arranged or omitted. Components represented by the blocks of the diagram are implemented by hardware, software, firmware, and/or any combination of hardware, software and/or firmware.

Figure 4:
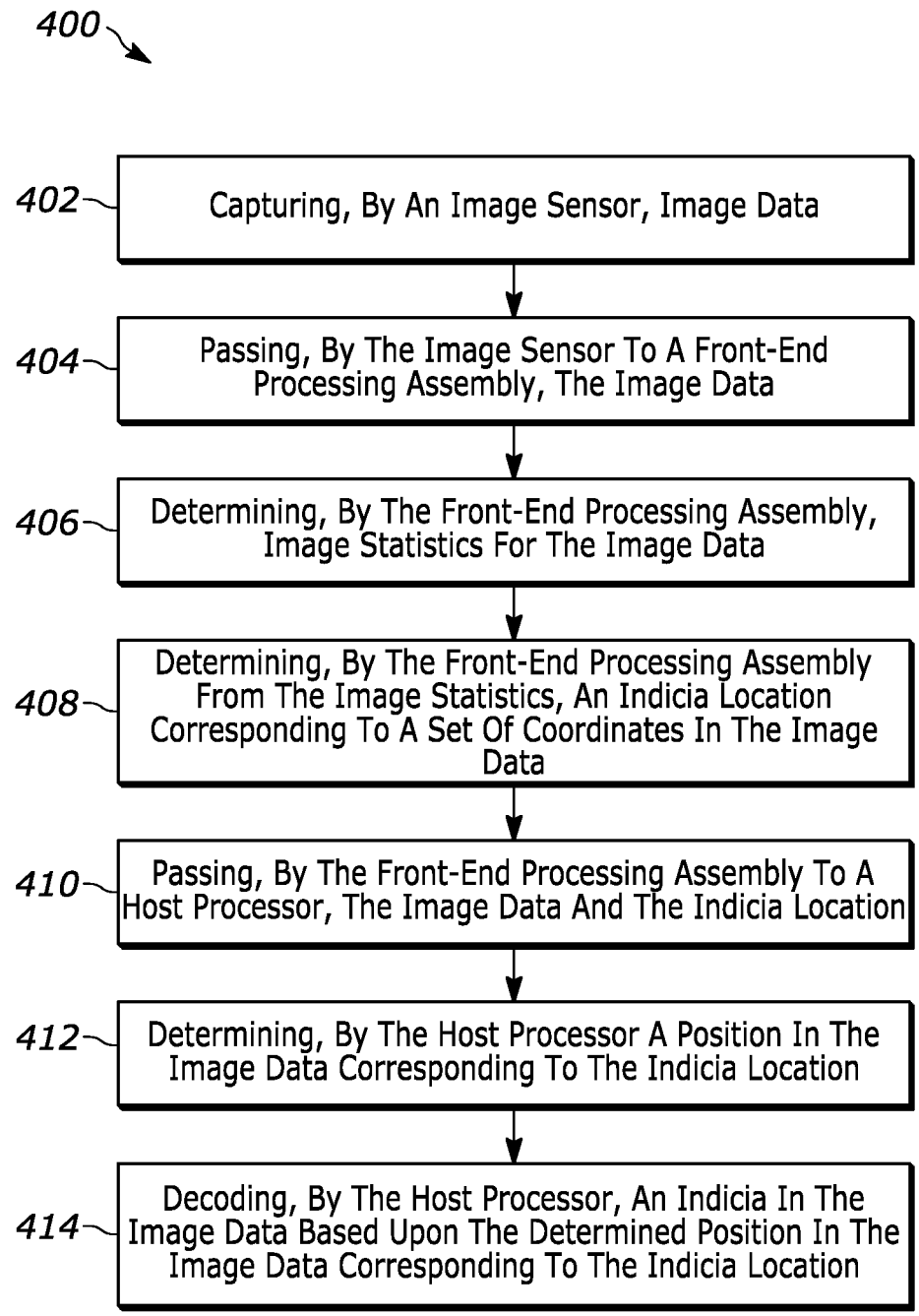
FIG. 4 is a block diagram of an example flowchart for an example method and/or operation described herein.

FIG. 4 is a block diagram of an example flowchart for an example method and/or operation 400 described herein. The method and/or operation 400 may employ any of the components, apparatuses, devices, and/or systems described herein with respect to FIGS. 1-3.

The method and/or operation 400 may begin at block 402 by capturing, by an image sensor 112, image data. In some embodiments, the image sensor 112 may be activated in response to (i) the triggering of one or more sensors 122 (e.g., detected light from a light sensor, detected object 201 from a proximity sensor, detected motion from a motion sensor, detected weight differential from a scale, etc.), (ii) mechanical activation (e.g., a physical trigger mechanism), and/or (iii) a timer reaching a threshold time. Additionally or alternatively, in some embodiments, the image sensor 112, may capture a series of images at a first predetermined time interval.

The method and/or operation 400 may proceed to block 404 by passing, by the image sensor 112 to a front-end processing assembly 104, the image data. In some embodiments, the front-end processing assembly 104 may comprise (i) a first processor (e.g., the image stats processor 104a) configured to receive the image data and determine image statistics and (ii) a second processor (e.g., the indicia location processor 104b) configured to determine an indicia location. In this embodiment, the first processor and the second processor may be co-processors of an integrated circuit. Alternatively, the first processor and the second processor may be dedicated processors coupled together via a dedicated communication bus. In an alternative embodiment, the front-end processing assembly 104 may comprise a single processor configured to receive the image data, determine the image statistics, and determine the indicia location. Additionally or alternatively, in some embodiments, the image sensor 112 may pass each image in the series of images to a front-end processing assembly 104 at the first predetermined time interval.

The method and/or operation 400 may proceed to block 406 by determining, by the front-end processing assembly 104, image statistics for the image data. The image statistics may be determined by segmenting the image data into a plurality of image blocks of a predetermined size (e.g., 8×8 pixels) and analyzing the image data at each of the segmented blocks. The image statistics may be image contrast, maximum intensity, minimum intensity, average intensity; direction of edges; and/or diversity of direction edges. For example, the front-end processing assembly 104 may be configured to determine the image statistics by constructing a version of the image data (e.g., a contrast version of the image data, a maximum intensity version of the image data, a minimum intensity version of the image data, etc.). The front-end processing assembly 104 may then determine the indicia location based upon the constructed version of the image data.

The method and/or operation 400 may proceed to block 408 by determining, by the front-end processing assembly 104 from the image statistics, an indicia location corresponding to a set of point coordinates in the image data. The indicia location may be (i) a set of one or more point coordinates related to an object (e.g., an object 201 featuring an indicia 212) of interest in the image data, (ii) a rectified bounding box enclosing an object of interest in the image data, (iii) a centroid of a portion of the image data according to predetermined criteria, and/or (iv) any other image location indication and/or data derived from a portion of the image data.

The method and/or operation 400 may proceed to block 410 by passing, by the front-end processing assembly 104 to a host processor 106, the image data and the indicia location. Additionally or alternatively, in some embodiments, the front-end processing assembly 104 may pass the indicia location to the host processor 106 at a second predetermined time interval. The first predetermined time interval may be shorter in time than the second predetermined time interval.

The method and/or operation 400 may proceed to block 412 by determining, by the host processor a position in the image data corresponding to the indicia location. The method and/or operation 400 may proceed to block 414 by decoding, by the host processor, an indicia in the image data based upon the determined position in the image data corresponding to the indicia location.

The method and/or operation 400 may have more or less or different steps and/or may be performed in a different sequence.

In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit may include one or more of the plurality of processors 102. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device comprising:
    an image sensor to capture image data;
    a front-end processing assembly configured to:
        receive the image data and determine image statistics for the image data,
        determine, from the image statistics, an indicia location corresponding to a set of point coordinates in the image data, and
        communicate the image data and the determined indicia location to a host processor communicatively coupled to the front-end processing assembly; and
    wherein the host processor is configured to receive the image data and the indicia location and is configured to decode an indicia in the image data based upon determining a position in the image data corresponding to the indicia location;
    wherein the front-end processing assembly passes the image data to the host processor such that the front-end processing assembly and the host processor process the image data in parallel.

2. The device of claim 1, wherein determining the image statistics include segmenting the image data into a plurality of image blocks of a predetermined size and the image statics includes, for each image block, one or more of: (i) image contrast, (ii) maximum intensity, (iii) minimum intensity, (iv) average intensity, (v) direction of edges, or (vi) diversity of direction of edges.

3. The device of claim 1, wherein the front-end processing assembly is configured to determine the image statistics by constructing a contrast version of the image data and is further configured to determine the indicia location from the contrast version of the image data.

4. The device of claim 1, wherein the front-end processing assembly is configured to determine the image statistics by constructing a maximum intensity version of the image data and is further configured to determine the indicia location from the maximum intensity version of the image data.

5. The device of claim 1, wherein the front-end processing assembly is configured to determine the image statistics by constructing a minimum intensity version of the image data and is further configured to determine the indicia location from the minimum intensity version of the image data.

6. The device of claim 1, wherein the indicia location includes a set of one or more point coordinates related to an object of interest in the image data.

7. The device of claim 1, wherein the indicia location includes a rectified bounding box enclosing an object of interest in the image data, wherein the rectified bounding box has horizontal sides parallel to a horizontal axis of a coordinate plane and vertical sides parallel to a vertical axis of the coordinate plane.

8. The device of claim 1, wherein the front-end processing assembly comprises (i) a first processor configured to receive the image data and determine the image statistics and (ii) a second processor configured to determine the indicia location.

9. The device of claim 8, wherein the first processor and the second processor are co-processors of an integrated circuit.

10. The device of claim 8, wherein the first processor and the second processor are dedicated processors coupled together via a dedicated communication bus.

11. The device of claim 1, wherein the image sensor is activated in response to one or more of: (i) detected light from a light sensor, (ii) detected object from a proximity sensor, (iii) detected motion from a motion sensor, (iv) detected weight differential from a scale, (v) mechanical activation, or (vi) a set time duration.

12. A computer-implemented method, comprising:
    capturing, by an image sensor, image data;
    passing, by the image sensor to a front-end processing assembly, the image data;
    determining, by the front-end processing assembly, image statistics for the image data;
    determining, by the front-end processing assembly from the image statistics, an indicia location corresponding to a set of point coordinates in the image data;
    passing, by the front-end processing assembly to a host processor, the image data and the indicia location;
    determining, by the host processor a position in the image data corresponding to the indicia location; and
    decoding, by the host processor, an indicia in the image data based upon the determined position in the image data corresponding to the indicia location;
    wherein the front-end processing assembly passes the image data to the host processor such that the front-end processing assembly and the host processor process the image data in parallel.

13. The computer-implemented method of claim 12, wherein capturing image data comprises:
    capturing, by the image sensor, a series of images at a first predetermined time interval; and
    passing, by the image sensor to the front-end processing assembly, each image in the series of images at the first predetermined time interval.

14. The computer-implemented method of claim 13, further comprising:
    passing, by the front-end processing assembly to the host processor, the indicia location at a second predetermined time interval, wherein the first predetermined time interval is shorter in time than the second predetermined time interval.

15. The computer-implemented method of claim 12, wherein determining the image statistics comprises:
    segmenting, by the front-end processing assembly, the image data into a plurality of image blocks of a predetermined size; and
    determining, by the front-end processing assembly for each image block, one or more of:

(i) image contrast, (ii) maximum intensity, (iii) minimum intensity, (iv) average intensity, (v) direction of an edge, or (vi) diversity of directions of edges.

16. The computer-implemented method of claim 12, wherein determining the image statistics comprises:
   constructing, by the front-end processing assembly, a contrast version of the image data; and
   determining, by the front-end processing assembly, the indicia location from the contrast version of the image data.

17. The computer-implemented method of claim 12, wherein determining the image statistics comprises:
   constructing, by the front-end processing assembly, a maximum intensity version of the image data; and
   determining, by the front-end processing assembly, the indicia location from the maximum intensity version of the image data.

18. The computer-implemented method of claim 12, wherein determining the image statistics comprises:
   constructing, by the front-end processing assembly, a minimum intensity version of the image data; and
   determining, by the front-end processing assembly, the indicia location from the minimum intensity version of the image data.

19. The computer-implemented method of claim 12, wherein determining an indicia location corresponding to a set of point coordinates in the image data comprises:
   determining, by the front-end processing assembly, a set of one or more point coordinates related to an object of interest in the image data.

20. The computer-implemented method of claim 12, wherein determining an indicia location corresponding to a set of point coordinates in the image data comprises:
   determining, by the front-end processing assembly, a rectified bounding box enclosing an object of interest in the image data, wherein the rectified bounding box has horizontal sides parallel to a horizontal axis of a coordinate plane and vertical sides parallel to a vertical axis of the coordinate plane.

\* \* \* \* \*